United States Patent [19]

Pfeffer et al.

[11] Patent Number: 5,045,296
[45] Date of Patent: Sep. 3, 1991

[54] SODIUM CARBONATE PERHYDRATE PROCESS

[75] Inventors: Henry A. Pfeffer, Mercerville, N.J.; Charles Adams, Jr., Cartersville, Ga.

[73] Assignee: FMC Corporation, Philadelphia, Pa.

[21] Appl. No.: 646,137

[22] Filed: Jan. 25, 1991

Related U.S. Application Data

[63] Continuation of Ser. No. 428,729, Oct. 30, 1989.

[51] Int. Cl.$^5$ .............................. C01B 15/10
[52] U.S. Cl. ............... 423/415 P; 423/272; 252/186.38; 252/186.43
[58] Field of Search ............ 423/415 P, 272; 252/186.38, 186.43

[56] References Cited

U.S. PATENT DOCUMENTS

| | | | |
|---|---|---|---|
| 1,950,320 | 3/1934 | Müller | 423/415 P |
| 3,860,694 | 1/1975 | Jayawant | 423/415 P |
| 3,864,454 | 2/1975 | Pistor et al. | 423/415 P |
| 3,960,888 | 6/1976 | Plöger et al. | 423/415 P |
| 4,131,562 | 12/1978 | Lutz et al. | 423/415 P |
| 4,171,280 | 10/1979 | Maddox et al. | 423/415 P |
| 4,279,769 | 6/1981 | Yagi et al. | 423/415 P |
| 4,388,287 | 6/1983 | Sugano et al. | 423/415 P |
| 4,409,197 | 10/1983 | Sugano et al. | 423/415 P |
| 4,849,198 | 7/1989 | Ruhs | 423/415 P |
| 4,966,762 | 10/1990 | Pfeffer et al. | 423/415 P |
| 4,970,019 | 11/1990 | Crosby et al. | 423/415 P |
| 4,970,058 | 11/1990 | Hills et al. | 423/415 P |

FOREIGN PATENT DOCUMENTS

| | | | |
|---|---|---|---|
| 070211 | 6/1983 | European Pat. Off. | 423/415 P |
| 132570 | 10/1978 | German Democratic Rep. | 423/415 P |
| 140140 | 2/1980 | German Democratic Rep. | 423/415 P |
| 212947 | 8/1984 | German Democratic Rep. | 423/415 P |
| 213417 | 9/1984 | German Democratic Rep. | 423/415 P |
| 47-36636 | 9/1972 | Japan | 423/415 P |
| 60-11210 | 1/1985 | Japan | 423/415 P |

Primary Examiner—Gary P. Straub
Attorney, Agent, or Firm—R. E. Elden; R. L. Andersen

[57] ABSTRACT

A process is provided to react anhydrous carbonate with a particle size between 300 and 74 micrometers and hydrogen peroxide containing a hydroxyalkylidene diphosphonic acid to produce sodium carbonate perhydrate containing 13% to 14½% active oxygen. The process differs from the prior art in that reaction mixture is substantially dry at all times. The product is stable even without added stabilizers.

12 Claims, No Drawings

SODIUM CARBONATE PERHYDRATE PROCESS

This application is a continuation of application Ser. No. 428,729, filed Oct. 30, 1989.

This invention provides a process to manufacture a free-flowing, stable, granular composition comprising 65% to 90% sodium carbonate perhydrate containing from about 13% to about 14½% active oxygen.

Sodium carbonate perhydrate has been recognized to be a desirable component for a detergent composition because it is readily soluble in water, because it has a high active oxygen content, and because it also provides an inexpensive source of nonpolluting alkalinity. Pure sodium carbonate perhydrate conforms to the chemical formula $2Na_2CO_3 \cdot 3H_2O_2$ which contains 15.28% active oxygen (AO).

Numerous processes have been proposed for manufacturing sodium carbonate perhydrate (SCP). One of the primary methods is a wet process in which aqueous solutions of hydrogen peroxide and sodium carbonate are mixed in a reactor and the SCP formed is filtered off. The product is sometimes salted out by the addition of sodium chloride or other suitable reagents. Such processes are disclosed in U.S. Pat. Nos. 2,380,620; 2,448,058; 2,541,733. While the wet process offers advantages such as good mixing and heat transfer, it has the disadvantage that there typically is a substantial loss of active oxygen in the mother liquor, so that low peroxygen efficiencies are obtained; that is, conversion of hydrogen peroxide utilized to active oxygen in the finished product is low.

In another method, taught by U.S. Pat. No. 3,555,696, SCP is made by a spray-drying process in which hydrogen peroxide solution is added immediately before atomization of a spray charge of sodium carbonate in a spray tower. Thereafter the product SCP is dried, yielding a very dusty product.

It is apparent from the prior art that large volumes of mother liquor are to be avoided. A process yielding high peroxygen efficiencies usually uses only a sufficiently large amount of water to act as a reaction medium and to provide a heat sink for the heat of reaction.

The desire to minimize the amount of water in the reaction system has led to exploration of the so-called "dry" method. However, when the reaction is carried out in the absence of a sufficient amount of water, the reaction is less efficient and decomposition losses are quite high. In the dry method, hydrogen peroxide is sprinkled directly onto sodium carbonate powder to form a moist mass, the mass is then dried, and the procedure is repeated to build up the oxygen content of the perhydrate. Attempts to operate such a process have produced only unsatisfactory perhydrate and thus it is not in commercial use, insofar as is known. Typical dry processes are taught in U.S. Pat. No. 3,864,454, in which it is necessary to dry the product in carbon dioxide and in European Patent Application 0070711, in which the reaction mixture is maintained in a vacuum before drying. In accordance with East German patent 212,947, the product is so fine that a separate recycling granulation step is required. On the other hand, U.S. Pat. No. 4,171,280 avoids the heat sink problem by restricting the amount of hydrogen peroxide to provide a maximum active oxygen content of the product to 6%, thereby avoiding decomposition and caking of wet reaction mixtures.

The dry process for the formation of SCP has a basic deficiency, namely, the difficulty of proper heat transfer of the exotherms that are generated as a result of the reaction. Reaction between aqueous hydrogen peroxide and solid soda ash generates an exotherm in two ways: the heat of hydration of sodium carbonate with the water present in hydrogen peroxide, and the heat of perhydration, that is, the reaction of sodium carbonate with hydrogen peroxide to produce sodium carbonate perhydrate. Both these heats tend to increase the reaction temperature quite markedly, particularly in the absence of efficient mixing and/or cooling.

Dusting is another problem associated with the dry process. When finely divided soda ash is sprinkled with hydrogen peroxide solution and mixed very efficiently to dissipate the heat, a large amount of dust is formed. This results in low peroxygen efficiency and/or a product having low active oxygen values. On the other hand, if granular, dense soda ash is used, the dusting effects are less but the reaction becomes relatively inefficient.

A hybrid process combining the dry process and the wet process is taught by U.S. Pat. No. 3,860,694 in which anhydrous or hydrated sodium carbonate having a particle size distribution between U.S. Standard Sieve No. 14 and 325 is contacted with a combination of 35% to 90% hydrogen peroxide, a magnesium stabilizer, and sufficient water to maintain the reaction mass moist. The moist reaction mass is reacted from 5 minutes to 3 hours. Subsequently the moist reaction mass is dried.

U.S. Pat. Nos. 4,966,762 and 4,970,058, filed Oct. 6, 1988, teach a sodium carbonate perhydrate composition and a process for making it, in which hydrogen peroxide, anhydrous sodium carbonate, and a diphosphonic acid are reacted to make a composition in which sufficient anhydrous sodium carbonate is present to react with any water either already present in the composition, or any water which may be formed from the hydrogen peroxide. The diphosphonic acid appears to permit any water present during the manufacture from being retained as sodium carbonate monohydrate or other hydrates. The process provides high peroxygen efficiency, low dusting and the product is very stable on storage. Its only apparent disadvantage is the maximum active oxygen concentration is about 11.2% which is about 73% sodium carbonate perhydrate. For some applications it is desirable to have a product with an active oxygen content higher than 11.2%.

The present invention provides a process for manufacturing sodium carbonate perhydrate consisting essentially of (a) uniformly distributing an aqueous solution consisting essentially of 50% to 75% by weight hydrogen peroxide and 1½% to 13% by weight of a $C_2$ to $C_6$ 1-hydroxyalkylidene-1,1-diphosphonic acid onto a substantially dry, agitated, particulate reaction mixture initially consisting essentially of substantially anhydrous granular sodium carbonate having a particle size distribution between 300 and 74 micrometers, (b) concurrently balancing the heats of hydration and of perhydration of sodium carbonate and the heat of evaporation of water with sufficient sensible heat transfer to maintain the reaction mixture between 50° C. and 80° C. and to evaporate substantially all of the free water from the resulting reaction mixture; and then (c) cooling the resulting reaction mixture to provide said product as a free-flowing, stable, granular material with a particle size distribution substantially the same as the anhydrous sodium carbonate, and containing between from 13% to 14½% active oxygen.

Preferably the temperature should be maintained between 60° C. and 70° C. during and for a short time after addition of the aqueous peroxide/phosphonate solution, and the rate of addition should be controlled to maintain a substantially dry reaction mixture.

The temperature of the reaction mixture can be maintained easily. For example, by a heat exchanger means providing sensible heat transfer between the reaction mixture and the reactor shell or by a gas stream contacting the reaction mixture providing sensible heat transfer for the reaction mixture.

Any suitable solids mixing reactor may be employed such as a fluid bed reactor or a solids mixing device such as a cone mixer, a ribbon mixer, or the like, provided the solids mixing reactor does not function as a size reduction device. Means should be provided in the reactor to conduct water vapor from the surface of the reaction mixture, such as, by directing a gas stream through the reactor. It is not necessary for a gas stream to be directed into the reaction mixture to provide part of the agitation of the reaction mixture. The velocity of a gas stream should be sufficiently low to avoid carrying off fines from the reactor.

Unexpectedly, it was found that the process eliminated the dusting problem of the prior art dry processes. The particle size distribution of the SCP product was found to be substantially the same as that of the sodium carbonate employed as feed. However, some agglomeration of fine particles does take place. Further, it was unexpectedly observed that not only was the peroxygen efficiency of the process essentially quantitative (98-100%), but the SCP product was stable, even without the addition of magnesium silicate, sodium silicate or other stabilizers required by prior art processes.

However, it is contemplated that stabilizers such as magnesium compounds, silicates or both may be added if desired to the soda ash, to the reaction mixture or to the hydrogen peroxide. In addition, it is contemplated that the SCP product may be subsequently coated or formulated into a product.

The particle size distribution of the sodium carbonate particles appears to be critical when measured either by product stability, peroxygen efficiency or by maximum active oxygen concentration. Individual particles passing through a 74 $\mu$m sieve (U.S.A. Standard) are too prone to be dispersed in the atmosphere, thus resulting in a low product recovery. Individual particles retained on a 300 $\mu$m sieve (U.S.A. Standard) are undesirable because of a low peroxygen efficiency, a low peroxygen assay and low storage stability. For the purpose of this invention a particle size distribution between 300 and 74 micrometers shall include particles passing through a U.S. Standard 300 $\mu$m sieve and particles retained on a U.S. Standard 74 $\mu$m sieve.

Any 65-85% aqueous hydrogen peroxide solution can be used for the process. Preferably about 70% hydrogen peroxide will be employed thereby minimizing the sensible heat needed to be added or deducted from the system. The hydrogen peroxide-diphosphonic acid solution must be added at a controlled rate to provide that the reaction mixture remains substantially dry. Water must be permitted to escape from the reaction mixture as vapor, and hydrogen peroxide must be permitted time to form SCP and not accumulate as a liquid.

The presence of 1½% to 13% hydroxyalkylidene diphosphonic acid in the hydrogen peroxide is critical to obtain a dry product. The diphosphonic acid appears to be effective during the reaction to permit water to be released from the reaction mixture rather than be retained as free or hydrate water. The presence of the diphosphonic acid does not appear to prevent formation of sodium carbonate monohydrate subsequent to the manufacture of the SCP. The amount of diphosphonic acid required is not related to chelation of polyvalent cations. The diphosphonic acid appears to promote the release of water from the reaction mixture in a similar manner to that described in U.S. Pat. Nos. 4,966,762 and 4,970,058. However, an entirely different product is formed than by the process of the above patent applications. The product made by the present process generally has a higher active oxygen content and contains water as water of hydration.

A particularly desirable diphosphonic acid is commercially available as a 60% solution of 1-hydroxyethylidene-1,1-diphosphonic acid under the tradename Dequest 2010 by Monsanto Corporation. The diphosphonic acid solution is usually employed in sufficient quantity to reduce the concentration of 65% to 85% hydrogen peroxide to about 50% to 75%. Preferably sufficient diphosphonic acid should be employed to provide 0.5% to 3.5% diphosphonic acid in the product.

For the purpose of this invention the term diphosphonic acid shall include any $C_2$-$C_6$ 1-hydroxyalkylidene-1,1-diphosphonic acid or salt. The diphosphonic acid in releasing the water from the reaction mixture assists in removing heat generated by the perhydration and hydration of sodium carbonate. Whatever mechanism is involved, the present process eliminates the problems of the prior art dry processes which produced an unsatisfactory SCP product even when the process was broken up into several steps. The present process also avoids the need for maintaining the reaction mixture wet for at least 5 minutes as taught by U.S. Pat. No. 3,860,694 and other prior art "dry" processes.

The amount of sensible heat necessary can be determined easily by one skilled in the art without undue experimentation. Sensible heat can be added to the reaction mixture when more dilute hydrogen peroxide is employed or in the event that insufficient water is being evaporated to maintain the desired temperature or sensible heat can be withdrawn when more highly concentrated hydrogen peroxide is employed. Heat transfer can be accomplished by means well known to the art such as heating or cooling the reactor walls, or by heating or cooling with air contacting the reaction mixture.

The product may then be cooled by any known means, for example, by passing ambient air through the reactor, cooling the reactor walls, preferably to a temperature in the range of 15° C. to 50° C., to provide a free-flowing, stable, granular sodium carbonate perhydrate product.

The following examples are provided to illustrate the best mode of practicing the process and are not intended to limit the claimed invention in any way.

EXAMPLES

Commercial sodium carbonate (FMC Corporation Grade 120) was employed as a raw material. Particle size distribution on separate samples is presented as Table I comparing two samples each of unsieved (T1 and T2), a minus 70 mesh cut (S1 and S2) and a plus 70 mesh cut (L1 and L2). Table I demonstrates the uniformity of the sodium carbonate particles.

As used herein mesh size is the alternative U.S. Standard Sieve designation of the ASTM publication E380-79, *Standard for Metric Practice* and is used interchangeably with the equivalent particle size in micrometers of a U.S. Standard Sieve.

Unless otherwise stated the following procedure was employed to prepare SCP containing 13.5% active oxygen. A ribbon blender was charged with 200 parts by weight sodium carbonate which was preheated to 60° C. While the blender was turning at 58 rpm, an aqueous solution consisting of 64 parts by weight hydrogen peroxide plus 7 parts by weight of a 60% solution of 1-hydroxyethylidene-1,1-diphosphonic acid was sprayed onto the bed. Air heated at 70°–80° C. was directed over the bed of the reaction mixture to maintain the bed temperature at 65°–70° C. After all of the hydrogen peroxide solution was added the dry reaction mixture was cooled to 50° C. The reaction mixture appeared to be composed of free-flowing, dry particles throughout the reaction period.

COMPARATIVE EXAMPLE A

A sample was processed as above, but without any diphosphonic addition. The reaction mixture became wet and began to decompose. This confirms the teaching of U.S. Pat. No. 4,171,280 to Maddox and demonstrates the criticality of the diphosphonic acid to make a product contain more than 6% active oxygen.

EXAMPLE 1

Two samples of sodium carbonate were processed by the general procedure. In comparative sample 1A +70 mesh sodium carbonate was employed while in Inventive Example 1B the sodium carbonate was −70 mesh. Results are presented as Table II. The 20 and 40 mesh product fraction of Example 1B was composed of agglomerates as is evident from the feed distribution of Table I. Example 1A also shows that the assay of the larger particles was low. In Example 1A the assay of the composite sample was only 11.5% AO although the example was designed to produce a 13.5% AO product.

EXAMPLE 2

A hydrogen peroxide diphosphonic acid solution was fed to a sodium carbonate feed to obtain a 13.5% AO product. Run 104, unsieved sodium carbonate, had an 84% peroxygen efficiency. Runs 102 and 105 (−70 mesh cuts) had a 98% peroxygen efficiency. Runs 101 and 103 (+70 mesh cuts) could not be brought up to a 13.5% AO assay.

EXAMPLE 3

Six samples of SCP were produced with a range of active oxygen contents using unsieved and −70 mesh cuts of sodium carbonate feed. The loss of active oxygen was observed after storage for two weeks at 40° C. at 80% relative humidity. Results are presented as Table III which shows the present process can produce a stable product ranging from 10.6% to 14% AO.

EXAMPLE 4

A sample of SCP made by the above process was analyzed and the results are presented as Table IV. Total alkalinity and percent $H_2O_2$ were determined by titration. Water loss was determined by loss in weight at 170° C. for 60 minutes corrected for hydrogen peroxide present. The percentage of diphosphonic acid was determined by difference which checked with the amount added initially.

TABLE I

SODIUM CARBONATE % PARTICLE SIZE DISTRIBUTION

| Size | | Unsieved | | −70 Mesh | | −70 Mesh | |
|---|---|---|---|---|---|---|---|
| μm | Mesh | T1 | T2 | S1 | S2 | L1 | L2 |
| 425 | 40 | 3.89 | 3.45 | 0.01 | 0.07 | 4.45 | 4.37 |
| 300 | 50 | 20.68 | 20.03 | 0.02 | 0.02 | 31.69 | 29.61 |
| 212 | 70 | 37.88 | 37.91 | 11.36 | 20.51 | 55.83 | 57.70 |
| 150 | 100 | 22.40 | 21.67 | 44.92 | 44.09 | 7.73 | 7.99 |
| 90 | 140 | 10.48 | 11.19 | 28.46 | 23.87 | 0.16 | 0.17 |
| 75 | 200 | 2.76 | 3.18 | 8.89 | 7.09 | 0.04 | 0.02 |
| <75 | <200 | 1.91 | 2.57 | 6.34 | 4.36 | 0.10 | 0.13 |

TABLE II

ANALYSIS OF SAMPLES BY PARTICLE SIZE

| | +70 Mesh Feed Comparative Example 1A | | −70 Mesh Feed Example 1B | |
|---|---|---|---|---|
| Mesh | wt. | Assay % AO | % wt. | Assay % AO |
| 20 | 4.52 | 6.8 | 11.54** | 13.9 |
| 40 | 16.58 | 9.4 | 3.10** | 13.7 |
| 70 | 66.37 | 11.0 | 16.02 | 13.8 |
| 100 | 10.17 | 13.2 | 25.51 | 13.8 |
| 140 | 2.0 | 12.4 | 21.25 | 14.0 |
| 200 | 0.25 | 12.7 | 14.2 | 14.1 |
| <200 | 0.09 | * | 9.5 | 14.6 |
| Composite Sample | | 11.5*** | | 13.8 |

*insufficient sample
**these were agglomerates of finer particles
***maximum attainable assay

TABLE III

DECOMPOSITION IN 2 WEEKS AT 40° C. AND 80% RH

| No. | Sample | % AO | % Active Oxygen Loss |
|---|---|---|---|
| 1 | Unsieved | 10.7 | 25 |
| 2 | Unsieved | 13.3 | 51 |
| 3 | −70 cut | 10.6 | 2 |
| 4 | −70 cut | 11.5 | 11 |
| 5 | −70 cut | 13.4 | 2 |
| 6 | −70 cut | 13.7 | 6 |

TABLE IV

ANALYSIS OF SCP SAMPLES

| Analysis | Run 109 |
|---|---|
| % $Na_2CO_3$ | 67.1 |
| % $H_2O_2$ | 29.4 |
| % $H_2O$ (Wt. Loss at 170° C. corrected for $H_2O_2$) | 1.3 |
| % Diphosphonic Acid by diff. | 2.2 |

We claim:

1. A process for manufacturing sodium carbonate perhydrate consisting essentially of (a) uniformly distributing an aqueous solution consisting essentially of 50% to 70% by weight hydrogen peroxide and 1½% to 13% by weight of a $C_2$ to $C_6$ 1-hydroxyalkylidene-1,1-diphosphic acid onto a substantially dry, agitated, particulate reaction mixture initially consisting essentially of substantially anhydrous granular sodium carbonate having a particle size less than 70 mesh, (b) concurrently balancing the heats of hydration and of perhydration of sodium carbonate and the heat of evaporation of water with sufficient sensible heat transfer to maintain the reaction mixture at a temperature between 50° C. and 80° C. and to evaporate substantially all of the free water from the resulting reaction mixture; and (c) cooling the resulting reaction mixture to provide said product as a free-flowing, stable, granular material with a particle size distribution substantially the same as the sodium carbonate, and containing 13.8% to 14.6% active oxygen.

2. The process of claim 1 wherein the diphosphonic acid is 1-hydroxyethylidene-1,1-diphosphonic acid.

3. The process of claim 1 wherein about 12 to 18% parts by weight of a 60% solution of 1-hydroxythylidene-1,1-diphosphonic acid is incorporated into 100 parts by weight 70 wt. percent hydrogen peroxide to form a 60% $H_2O_2$ solution containing 7% 1-hydroxyethylidene.

4. The process of claim 1 wherein the temperature of the reaction mixture is maintained between 60° C. and 70° C.

5. The process of claim 2 wherein the temperature of the reaction mixture is maintained between 60° C. and 70° C.

6. The process of claim 3 wherein the temperature of the reaction mixture is maintained between 60° C. and 70° C.

7. The process of claim 1 wherein sufficient 1-hydroxyalkylidene-1,1-diphosphonic acid is present in the hydrogen peroxide to provide about 0.5% to 3.5% thereof in the product.

8. The process of claim 2 wherein sufficient 1-hydroxyalkylidene-1,1-diphosphonic acid is present in the hydrogen peroxide to provide about 0.5% to 3.5% thereof in the product.

9. The process of claim 3 wherein sufficient 1-hydroxyalkylidene-1,1-diphosphonic acid is present in the hydrogen peroxide to provide about 0.5% to 3.5% thereof in the product.

10. The process of claim 4 wherein sufficient 1-hydroxyalkylidene-1,1-diphosphonic acid is present in the hydrogen peroxide to provide about 0.5% to 3.5% thereof in the product.

11. The process of claim 5 wherein sufficient 1-hydroxyalkylidene-1,1-diphosphonic acid is present in the hydrogen peroxide to provide about 0.5% to 3.5% thereof in the product.

12. The process of claim 6 wherein sufficient 1-hydroxyalkylidene-1,1-diphosphonic acid is present in the hydrogen peroxide to provide about 0.5% to 3.5% thereof in the product.

* * * * *

UNITED STATES PATENT AND TRADEMARK OFFICE
CERTIFICATE OF CORRECTION

PATENT NO. : 5,045,296

DATED : September 3, 1991

INVENTOR(S) : Henry A. Pfeffer and Charles Adams, Jr.

It is certified that error appears in the above-identified patent and that said Letters Patent is hereby corrected as shown below:

Column 7, line 8, "1-hydroxythylidene-1,1-diphosphonic acid" should read --1-hydroxyethylidene-1,1-diphosphonic acid--.
Column 7, line 11, "containing 7% 1-hydroxyethylidene." should read --containing 7% 1-hydroxyethylidene-1,1-diphosphonic acid--.

Signed and Sealed this

Twelfth Day of January, 1993

Attest:

DOUGLAS B. COMER

*Attesting Officer*  *Acting Commissioner of Patents and Trademarks*